(12) United States Patent
Mayer et al.

(10) Patent No.: US 11,747,465 B2
(45) Date of Patent: Sep. 5, 2023

(54) METHOD FOR OPERATING A RADAR SENSOR SYSTEM IN A MOTOR VEHICLE

(71) Applicant: Robert Bosch GmbH, Stuttgart (DE)

(72) Inventors: Marcel Mayer, Lonsee (DE); Michael Schoor, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 452 days.

(21) Appl. No.: 16/960,884

(22) PCT Filed: Nov. 22, 2018

(86) PCT No.: PCT/EP2018/082300
§ 371 (c)(1),
(2) Date: Jul. 8, 2020

(87) PCT Pub. No.: WO2019/145066
PCT Pub. Date: Aug. 1, 2019

(65) Prior Publication Data
US 2021/0080536 A1   Mar. 18, 2021

(30) Foreign Application Priority Data
Jan. 29, 2018   (DE) .......................... 102018201302.0

(51) Int. Cl.
*G01S 13/87* (2006.01)
*G01S 7/02* (2006.01)
(Continued)

(52) U.S. Cl.
CPC .............. *G01S 13/87* (2013.01); *G01S 7/023* (2013.01); *G01S 7/0232* (2021.05);
(Continued)

(58) Field of Classification Search
CPC ........ G01S 13/931; G01S 13/87; G01S 13/12; G01S 7/0235; G01S 7/023; G01S 7/003
(Continued)

(56) References Cited

U.S. PATENT DOCUMENTS 6,147,638 A * 11/2000 Rohling ................. G01S 13/58
342/134
7,737,880 B2 * 6/2010 Vacanti ................... G01S 13/87
342/159
(Continued)

FOREIGN PATENT DOCUMENTS

DE          10124909 A1    12/2002
DE     102015218542 A1 *   3/2017  ............. G01S 13/34
(Continued)

OTHER PUBLICATIONS

International Search Report for PCT/EP2018/082300, dated Feb. 25, 2019.

*Primary Examiner* — Vladimir Magloire
*Assistant Examiner* — Michael W Justice
(74) *Attorney, Agent, or Firm* — NORTON ROSE FULBRIGHT US LLP; Gerard Messina

(57) ABSTRACT

A method for operating a radar sensor system including multiple radar sensors operating independently of one another in a motor vehicle, wherein the radar sensors are synchronized with one another with respect to their transmission times and transmission frequencies in such a way that two radar signals whose frequency separation is smaller than a certain minimum frequency separation are at no point in time transmitted simultaneously.

20 Claims, 2 Drawing Sheets

(51) Int. Cl.
  *G01S 7/35* (2006.01)
  *G01S 7/40* (2006.01)
  *G01S 13/931* (2020.01)

(52) U.S. Cl.
  CPC .............. *G01S 7/0235* (2021.05); *G01S 7/35* (2013.01); *G01S 7/4008* (2013.01); *G01S 13/931* (2013.01); *G01S 2013/93271* (2020.01); *G01S 2013/93272* (2020.01); *G01S 2013/93274* (2020.01)

(58) Field of Classification Search
  USPC .................................................. 342/173, 70
  See application file for complete search history.

(56) References Cited

U.S. PATENT DOCUMENTS

| | | | | |
|---|---|---|---|---|
| 9,733,340 | B2 * | 8/2017 | Rao | G01S 13/931 |
| 2002/0067737 | A1 * | 6/2002 | Wego | H04L 12/403 |
| | | | | 370/442 |
| 2010/0097263 | A1 * | 4/2010 | Vacanti | G01S 7/35 |
| | | | | 342/70 |
| 2010/0150288 | A1 * | 6/2010 | Zhu | H03L 7/22 |
| | | | | 375/356 |
| 2016/0146931 | A1 * | 5/2016 | Rao | G01S 13/931 |
| | | | | 342/59 |
| 2016/0352388 | A1 | 12/2016 | Lane | |
| 2017/0363714 | A1 * | 12/2017 | Rao | G01S 13/931 |
| 2018/0284258 | A1 * | 10/2018 | Roger | G01S 13/872 |
| 2019/0056478 | A1 * | 2/2019 | Millar | H04B 1/69 |

FOREIGN PATENT DOCUMENTS

| | | | | |
|---|---|---|---|---|
| DE | 102015218542 | A1 | 3/2017 | |
| EP | 2180336 | A2 | 4/2010 | |
| EP | 1639758 | B1 * | 6/2013 | ............ H04L 12/40 |
| JP | 2015007615 | A | | 1/2015 |

* cited by examiner

METHOD FOR OPERATING A RADAR SENSOR SYSTEM IN A MOTOR VEHICLE

FIELD

The present invention relates to a method for operating a radar sensor system including multiple radar sensors operating independently of one another in a motor vehicle.

BACKGROUND INFORMATION

With increasing functional scope of driver assistance systems for motor vehicles and as the objective of completely autonomous driving is being progressively approached, an increasing number of radar sensors is installed in motor vehicles, which fulfill a plurality of different tasks independently of one another within the same vehicle, such as measurement of the distance from the preceding vehicle, detection of pedestrians at the roadside, blind spot monitoring, monitoring of the rear area of the vehicle, parking assistance and the like. As the number of the radar signal sources grows, the likelihood of disruptive interferences between radar signals transmitted by different radar sensors also increases.

SUMMARY

It is an object of the present invention to reduce the likelihood of such disruptive interferences.

This object may be achieved according to an example embodiment of the present invention by synchronizing the radar sensors with one another with respect to their transmission times and transmission frequencies in such a way that two radar signals whose frequency separation is smaller than a certain minimum frequency separation are at no point in time transmitted simultaneously.

The minimum frequency separation is selected in such a way that at least the radar signals transmitted by different radar sensors of the same vehicle do not result in disruptive interferences, i.e., that the beats resulting from the superposition of such signals have a frequency which is outside the frequency range considered during the signal evaluation in the individual radar sensors. Since superpositions of the radar signals may also be caused by reflections and multiple reflections on objects in the surroundings of the vehicle, it is advantageous to also synchronize radar sensors with one another in this way whose transmission and reception ranges actually do not overlap one another.

Synchronizing of multiple radar sensors in a vehicle with one another is described, for example, in German Patent Application No. DE 101 24 909 A1. Such a synchronization is required whenever the radar sensors cooperate with one another, for example by the evaluation of cross echoes, i.e., of radar signals which are transmitted by one sensor and received by another sensor. In contrast, the special characteristic of the present invention is that radar sensors which operate completely independently of one another are synchronized with one another.

Advantageous embodiments of the present invention are described herein.

In each individual radar sensor, the local time and frequency is usually derived by a crystal oscillator. For cost reasons, however, crystal oscillators are used whose frequency accuracy is limited and, for example, is in the order of magnitude of several MHz, which is not sufficient for a reliable interference avoidance. In one advantageous specific embodiment, a shared clock signal is thus provided to the radar sensors of the system, with which all radar sensors synchronize. In this way, an exact synchronization, which is also stable over extended periods of time, may be achieved, without having to use more expensive oscillators having a high frequency accuracy.

In general, a bus system is present in the motor vehicle, for example CAN, Flexray or Ethernet, via which the radar sensors communicate with other electronic components in the vehicle, for example with a processor of a driver assistance system, wheel speed sensors and the like. In one advantageous specific embodiment of the present invention, this bus system is used to provide the shared clock signal for the radar sensors so that no additional lines need to be run during the installation. The clock signal used for synchronization may be fed into the bus by a special clock generator as a kind of time stamp. In another specific embodiment of the present invention, however, it is also possible to use the data traffic taking place on the bus anyhow, which always takes place at a defined data rate, for a reconstruction of a shared clock signal in the individual radar sensors. Such a clock signal reconstruction (clock recovery) is provided, for example, with Ethernet clients anyway and may thus be used in the radar sensors for a frequency synchronization, for example with the aid of a frequency counter in a microcontroller or the like.

The synchronization of the radar sensors may be repeated at certain time intervals so that the synchronization is not distorted by aging effects or temperature effects in the local oscillators of the radar sensors.

An exemplary embodiment of the present invention is described in greater detail hereafter based on the figures.

DETAILED DESCRIPTION OF EXAMPLE EMBODIMENTS

Figure 1:
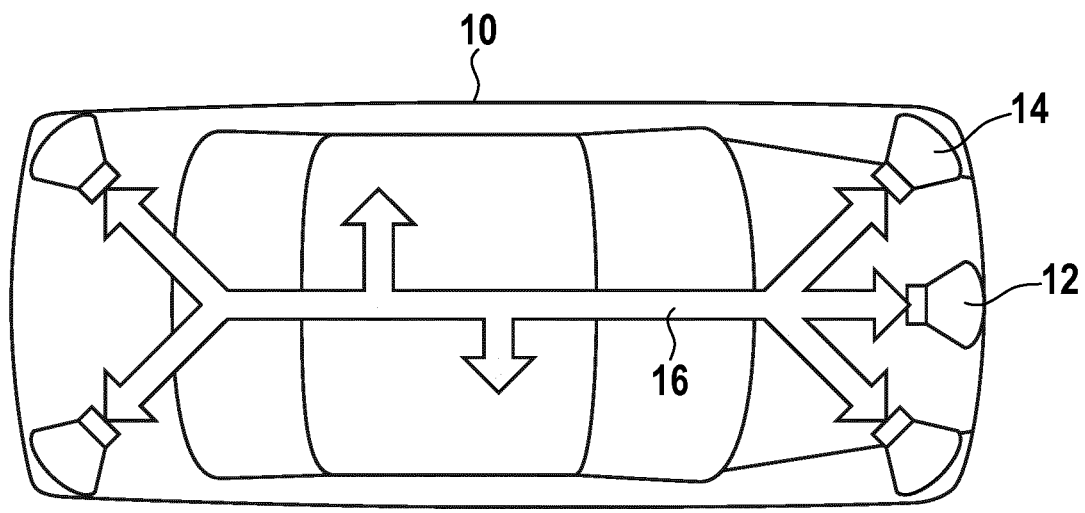
FIG. 1 shows an outline of a radar system including multiple radar sensors in a motor vehicle.

FIG. 1 schematically shows a layout of a motor vehicle 10 in which a total of five radar sensors 12, 14 operating independently of one another are installed. Radar sensor 12 is situated centrally in the front bumper of the vehicle and is used to measure the distances and relative speeds of preceding vehicles. The four radar sensors 14 are situated in the four corners of the vehicle and are used, for example, to detect pedestrians next to the vehicle's own lane, to detect passing vehicles on the adjoining lanes and the like. The radar sensor operate independently of one another in the sense that each radar sensor supplies measuring data about the objects located by it, without requiring any pieces of information from one of the other radar sensors to do so.

The vehicle includes a bus system 16, for example a CAN bus system, via which different sensor and actuator components and electronic control entities of the vehicle communicate with one another. Radar sensors 12, 14 are also connected to the bus system and communicate via this bus system, among other things, with a driver assistance system in which the positioning data are further evaluated.

In the example shown here, bus system 16 is also used to provide radar sensors 12, 14 with a shared clock signal, which allows radar sensors 12, 14 to be precisely synchronized with one another.

Figure 2:
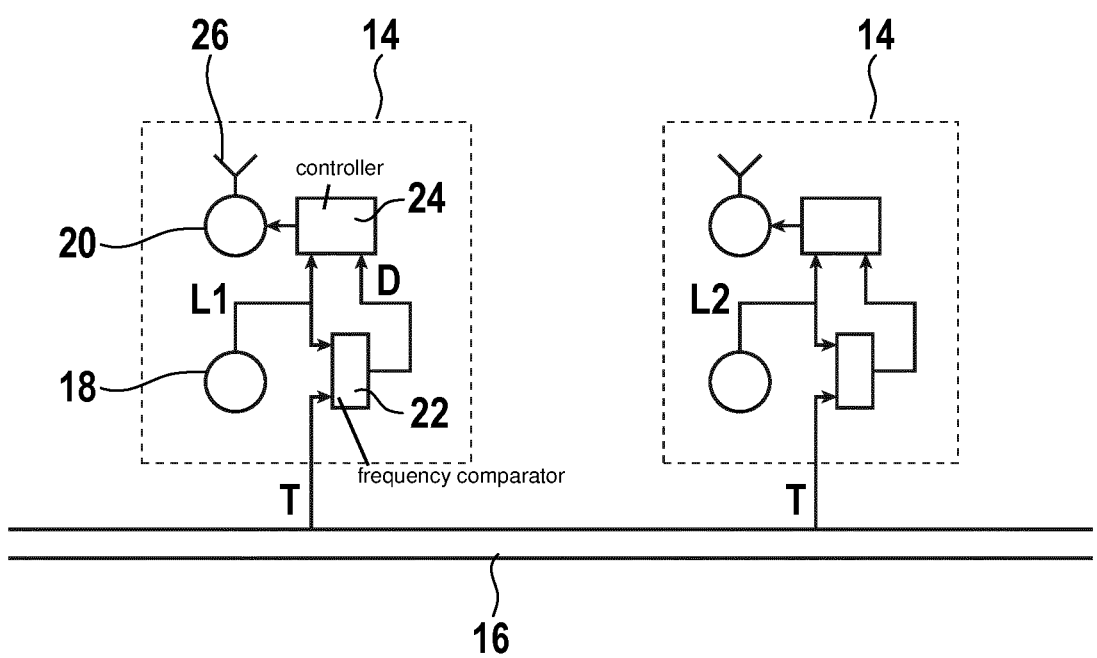
FIG. 2 shows a simplified circuit diagram of two radar sensors, which are synchronized with one another via a bus, in accordance with an example embodiment of the present invention.
Figure 3:
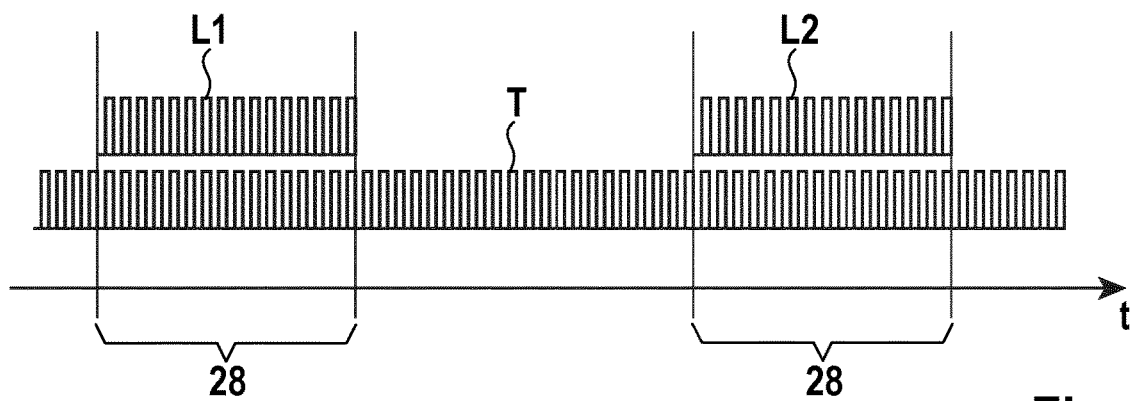
FIG. 3 shows a time diagram of clock signals for the synchronization of the radar sensors in accordance with an example embodiment of the present invention

FIG. 2 schematically shows two of radar sensors 14, which receive a shared clock signal T via bus system 16. Clock signal T may be made up of a continuous or intermittent sequence of rectangular pulses having a fixed clock frequency, as shown in FIG. 3. Each radar sensor includes a local base oscillator 18, which generates a local clock signal L1 and L2, which determines the local time in the particular radar sensor and also serves as a reference for the frequency of a radar signal generated by a local transmission oscillator 20. In the shown example, each radar sensor includes only a single transmission oscillator 20, but optionally it is also possible for multiple transmission oscillators to be present in the same radar sensor.

The frequency of shared clock signal T is compared to local clock signal L1 and L2 by a frequency comparator 22. In the event of a frequency deviation, frequency comparator 22 reports a deviation signal D to a controller 24, which activates transmission oscillator 20 and determines the frequency modulation of the radar signal, which is then emitted via an antenna 26.

As is shown in FIG. 3, frequency comparator 22 of each radar sensor to be synchronized counts a certain number of pulses of clock signal T. The counting in each case covers a time interval 28, whose duration is determined by the number of the counted pulses and by the frequency of clock signal T. In the simplified example shown here, only sixteen pulses of clock signal T are counted. In practice, however, the number of the counted pulses is considerably larger and is, for example, in the order of magnitude of a million.

Within the same time interval 28, the pulses of local clock signal L1 and L2 are also counted in each case. In the shown example, local clock signal L1 has the same frequency as shared clock signal T, i.e., sixteen pulses of clock signal L1 are also counted in time interval 28. The base oscillator generating clock signal L2, in contrast, has a slightly smaller frequency, so that only fifteen pulses are counted here in time interval 28. Based on the difference between the setpoint number of the pulses (sixteen in this example) and the actually counted number (fifteen in this example), the frequency deviation of the particular base oscillator may be ascertained, which is then reported as deviation signal D to controller 24.

It is not mandatory, of course, that the base oscillators 22 have the same frequency as clock signal T. It suffices that a certain setpoint ratio exists between these clock signals.

If, as is the case with local clock signal L2 here, a frequency deviation is established, controller 24 may correct the local time in the particular radar sensor based on deviation signal D. Based on deviation signal D, it is also possible to calibrate the frequency generated by transmission oscillator 20 to the frequency of clock signal T.

If, in this way, the local times and the transmission frequencies in all radar sensors are synchronized with clock signal T, a synchronization of the local times and frequencies of the radar sensors among one another is also achieved, without having to have precise knowledge of the absolute value of the frequency of shared clock signal T to do so. For this reason, clock signal T may be derived from any arbitrary signal which is available on bus system 16 and has a sufficiently stable frequency.

Figure 4:
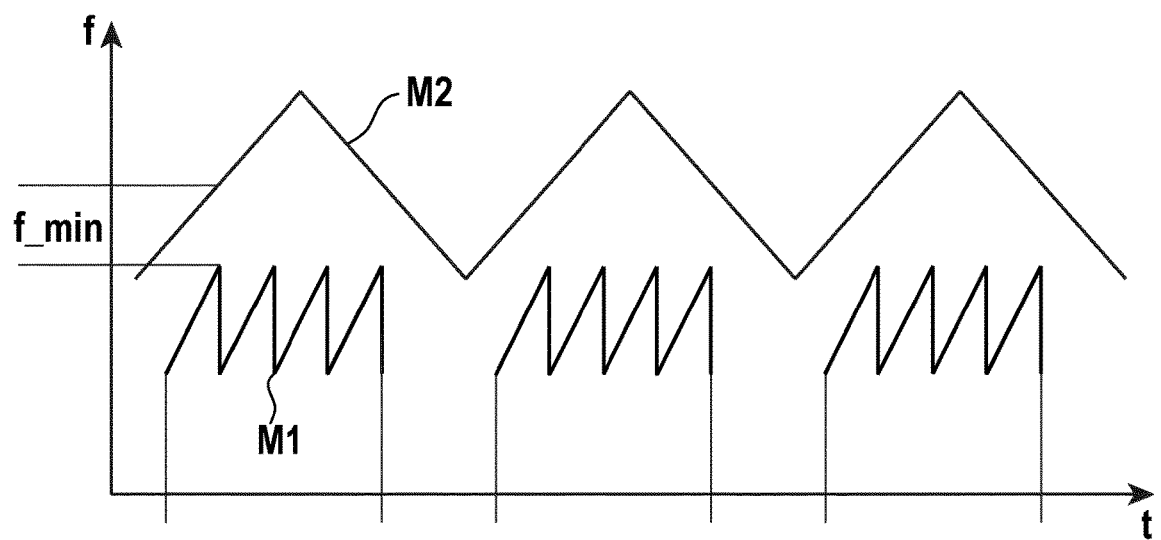
FIG. 4 shows different frequency modulation patterns of the radar signals transmitted by two radar sensors in accordance with an example embodiment of the present invention.

FIG. 4 shows, as simplified examples, two different frequency modulation patterns M1 and M2 (frequency f as a function of time t), which may be, for example, the transmission frequencies of transmission oscillators 20 of the two radar sensors shown in FIG. 2. As an example, it is assumed here that frequency modulation pattern M1 is made up of intermittently transmitted sequences of rising frequency ramps, while frequency modulation pattern M2 is made up of an alternating sequence of rising and falling ramps. Due to the synchronization via shared clock signal T, the frequencies in the two modulation patterns may be adjusted in such a way that, at any point in time, the ratio and thus also the frequency separation of the transmission frequencies are precisely known, regardless of potential frequency deviations between local clock signals L1 and L2. Since the local times in the radar sensors are also synchronized with one another, the modulation patterns in this example may also be synchronized with one another in such a way that the frequency minima of M2 in each case are in the pauses between the individual bursts of modulation pattern M1, as is shown in FIG. 4. In this way, it is possible to ensure with high precision that the frequency separation between the signals transmitted by the two radar sensors is not smaller, at any point in time, than a certain minimum frequency separation $f_{\_min}$. By appropriately selecting this minimum frequency separation $f_{\_min}$, taking the reception bandwidth of the sensors into consideration, it is then possible to ensure that the measuring data received with radar sensors 12, 14 of the system shown in FIG. 1 are not distorted by disruptive interferences when, for whatever reason, signals are received in any one of these radar sensors which are made up of a superposition of two or multiple of the signals transmitted by radar sensors 12, 14.

What is claimed is:

1. A method for operating a radar sensor system including a first radar sensor and a second radar sensor operating in a motor vehicle, the method comprising the following step:
    operating the first radar sensor to transmit radar signals with a first frequency ramp;
    operating the second radar sensor to transmit radar signals with a second frequency ramp, wherein:
       the transmission of at least part of the first frequency ramp overlaps in time with the transmission of at least part of the second frequency ramp so that there are a plurality of frequency pairs that each has a respective one of the frequencies of the first frequency ramp and a respective one of the frequencies of the second frequency ramp that are transmitted simultaneously;
       a frequency separation between the simultaneously transmitted frequencies of the first and second frequency ramps changes, during the radar signal transmissions, between different ones of the pairs; and
       each of at least one of the frequencies of the first frequency ramp has less than a predefined threshold frequency separation from one or more of the frequencies of the second frequency ramp; and
    synchronizing the first and second radar sensors with each other with respect to their transmission times and their ramp frequencies to ensure that, for each of the at least one of the frequencies of the first frequency ramp, the respective frequency does not occur simultaneously with any of the one or more of the frequencies of the second frequency ramp that is within the predefined threshold frequency separation from the respective frequency of the first ramp;

wherein, for the synchronization, the radar signals having the first and second frequency ramps are output so that the radar signals have at least one of the following features (a)-(d):

(a) the second frequency ramp is repeated intermittently with respective interruptions between pairs of immediately time adjacent instances of the second frequency ramp, and the first frequency ramp is output so that each instance of a lowest frequency of the first frequency ramp occurs during a respective one of the interruptions;

(b) the second frequency ramp is sawtooth wave shaped so that, for each instance of a highest frequency of the second frequency ramp, an immediately following one of the frequencies of the second frequency ramp is a respective instance of the lowest frequency of the second frequency ramp, and, for each of at least one instance of a highest frequency of the first frequency ramp, the first frequency ramp gradually lowers towards a respective instance of a lowest frequency of the first frequency ramp;

(c) the second frequency ramp is repeated multiple time during a single instance of the first frequency ramp; and (d) each instance of the lowest frequency of the second frequency ramp occurs when a frequency of the first frequency ramp is higher than the lowest frequency of the first frequency ramp.

2. The method as recited in claim 1, further comprising the following step:

providing a shared clock signal to the radar sensors, the radar sensors being synchronized with one another based on the shared clock signal.

3. The method as recited in claim 2, wherein a bus system present in the motor vehicle is used to provide the shared clock signal to the radar sensors.

4. The method as recited in claim 3, wherein the shared clock signal in each of the radar sensors is constructed based on data traffic taking place on the bus system.

5. The method as recited in claim 1, wherein, for the synchronization, the radar signals having the first and second frequency ramps are output so that the second frequency ramp is repeated intermittently with the interruptions, and the first frequency ramp is output so that each instance of the lowest frequency of the first frequency ramp occurs during the respective one of the interruptions.

6. The method as recited in claim 5, wherein the first frequency ramp is repeated continuously so that at least two immediately time adjacent instances of the first frequency ramp occur without interruption between them.

7. The method as recited in claim 5, wherein a frequency rate of change of the second frequency ramp is higher than a frequency rate of change of the first frequency ramp.

8. The method as recited in claim 1, wherein, for the synchronization, the radar signals having the first and second frequency ramps are output so that the second frequency ramp is sawtooth wave shaped so that, for each instance of the highest frequency of the second frequency ramp, the immediately following one of the frequencies of the second frequency ramp is the respective instance of the lowest frequency of the second frequency ramp, and, for each of the at least one instance of the highest frequency of the first frequency ramp, the first frequency ramp gradually lowers towards the respective instance of the lowest frequency of the first frequency ramp.

9. The method as recited in claim 8, wherein a frequency rate of change of the second frequency ramp is higher than a frequency rate of change of the first frequency ramp.

10. The method as recited in claim 1, wherein, for the synchronization, the radar signals having the first and second frequency ramps are output so that the second frequency ramp is repeated multiple time during the single instance of the first frequency ramp.

11. The method as recited in claim 10, wherein a frequency rate of change of the second frequency ramp is higher than a frequency rate of change of the first frequency ramp.

12. The method as recited in claim 1, wherein, for the synchronization, the radar signals having the first and second frequency ramps are output so that each instance of the lowest frequency of the second frequency ramp occurs when the frequency of the first frequency ramp is higher than the lowest frequency of the first frequency ramp.

13. The method as recited in claim 12, wherein a frequency rate of change of the second frequency ramp is higher than a frequency rate of change of the first frequency ramp.

14. A radar sensor system, comprising:

a first radar sensor and a second radar sensor operating in a motor vehicle;

wherein:

the system is configured to:

operate the first radar sensor to transmit radar signals with a first frequency ramp;

operate the second radar sensor to transmit radar signals with a second frequency ramp;

the transmission of at least part of the first frequency ramp overlaps in time with the transmission of at least part of the second frequency ramp so that there are a plurality of frequency pairs that each has a respective one of the frequencies of the first frequency ramp and a respective one of the frequencies of the second frequency ramp that are transmitted simultaneously;

a frequency separation between the simultaneously transmitted frequencies of the first and second frequency ramps changes, during the radar signal transmissions, between different ones of the pairs;

each of at least one of the frequencies of the first frequency ramp has less than a predefined threshold frequency separation from one or more of the frequencies of the second frequency ramp; and the system is configured to synchronize the first and second radar sensors with each other with respect to their transmission times and their ramp frequencies to ensure that, for each of the at least one of the frequencies of the first frequency ramp, the respective frequency does not occur simultaneously with any of the one or more of the frequencies of the second frequency ramp that is within the predefined threshold frequency separation from the respective frequency of the first ramp;

wherein, for the synchronization, the radar signals having the first and second frequency ramps are output so that the radar signals have at least one of the following features (a)-(d):

(a) the second frequency ramp is repeated intermittently with respective interruptions between pairs of immediately time adjacent instances of the second frequency ramp, and the first frequency ramp is output so that each instance of a lowest frequency of the first frequency ramp occurs during a respective one of the interruptions;

(b) the second frequency ramp is sawtooth wave shaped so that, for each instance of a highest frequency of the second frequency ramp, an immediately following one of the frequencies of the second frequency ramp is a respective instance of the lowest frequency of the second frequency ramp, and, for each of at least one instance of a highest frequency of the first frequency ramp, the first frequency ramp gradually lowers towards a respective instance of a lowest frequency of the first frequency ramp;

(c) the second frequency ramp is repeated multiple time during a single instance of the first frequency ramp; and (d) each instance of the lowest frequency of the second frequency ramp occurs when a frequency of the first frequency ramp is higher than the lowest frequency of the first frequency ramp.

15. The radar system as recited in claim 14, wherein each of the radar sensors includes:

at least one transmission oscillator configured to generate a respective one of the radar signals to be transmitted;

a controller configured to activate the transmission oscillator;

a local base oscillator configured to provide a local time and a frequency reference for the radar sensor; and a frequency comparator configured to compare a local clock signal generated by the local base oscillator to the shared clock signal and, in the event of a frequency deviation, report a deviation signal to the controller.

16. The radar system as recited in claim 14, wherein, for the synchronization, the radar signals having the first and second frequency ramps are output so that the second frequency ramp is repeated intermittently with the interruptions, and the first frequency ramp is output so that each instance of the lowest frequency of the first frequency ramp occurs during the respective one of the interruptions.

17. The radar system as recited in claim 16, wherein the first frequency ramp is repeated continuously so that at least two immediately time adjacent instances of the first frequency ramp occur without interruption between them.

18. The radar system as recited in claim 14, wherein, for the synchronization, the radar signals having the first and second frequency ramps are output so that the second frequency ramp is sawtooth wave shaped so that, for each instance of the highest frequency of the second frequency ramp, the immediately following one of the frequencies of the second frequency ramp is the respective instance of the lowest frequency of the second frequency ramp, and, for each of the at least one instance of the highest frequency of the first frequency ramp, the first frequency ramp gradually lowers towards the respective instance of the lowest frequency of the first frequency ramp.

19. The radar system as recited in claim 14, wherein, for the synchronization, the radar signals having the first and second frequency ramps are output so that the second frequency ramp is repeated multiple time during the single instance of the first frequency ramp.

20. The radar system as recited in claim 14, wherein, for the synchronization, the radar signals having the first and second frequency ramps are output so that each instance of the lowest frequency of the second frequency ramp occurs when the frequency of the first frequency ramp is higher than the lowest frequency of the first frequency ramp.

* * * * *